UNITED STATES PATENT OFFICE.

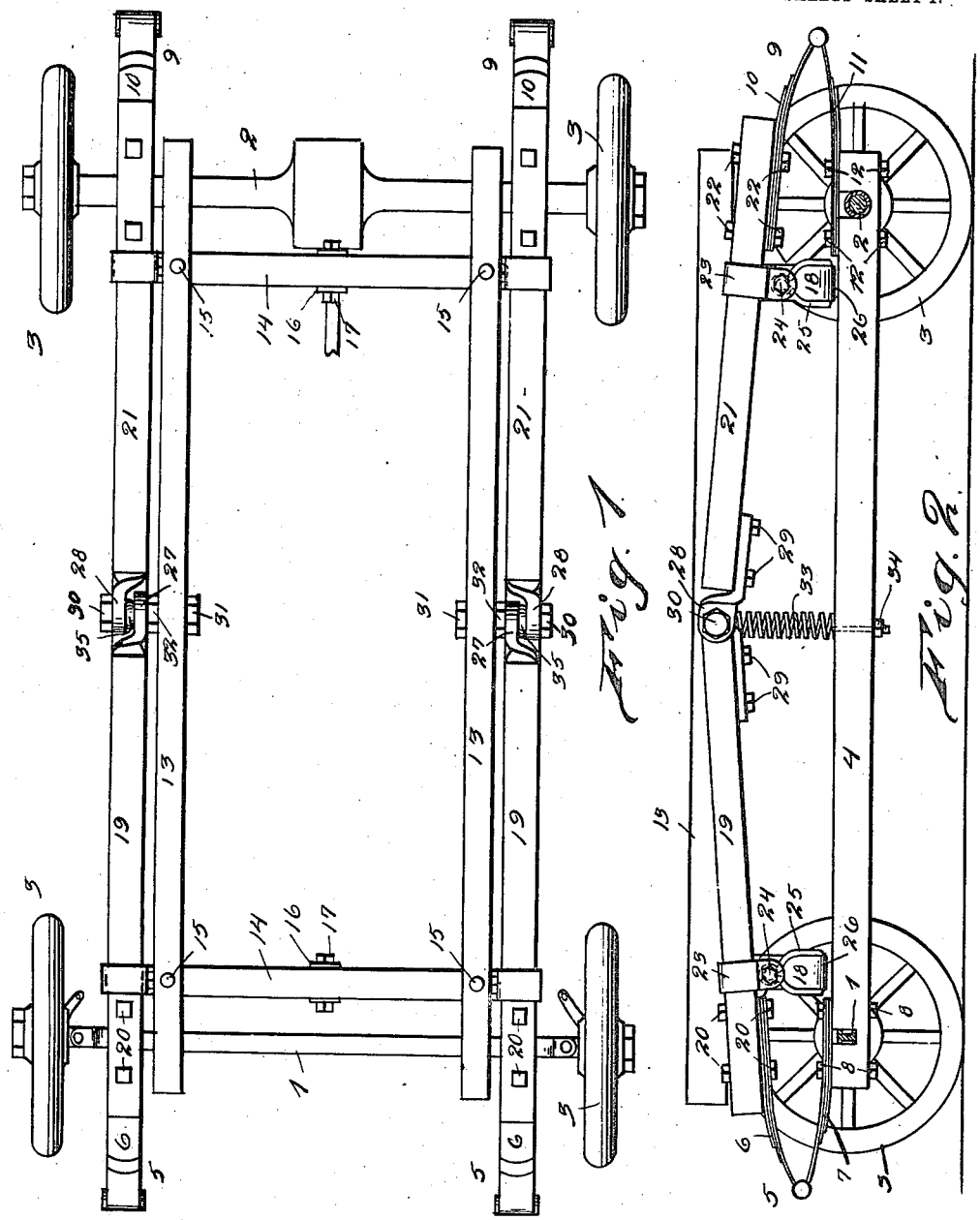

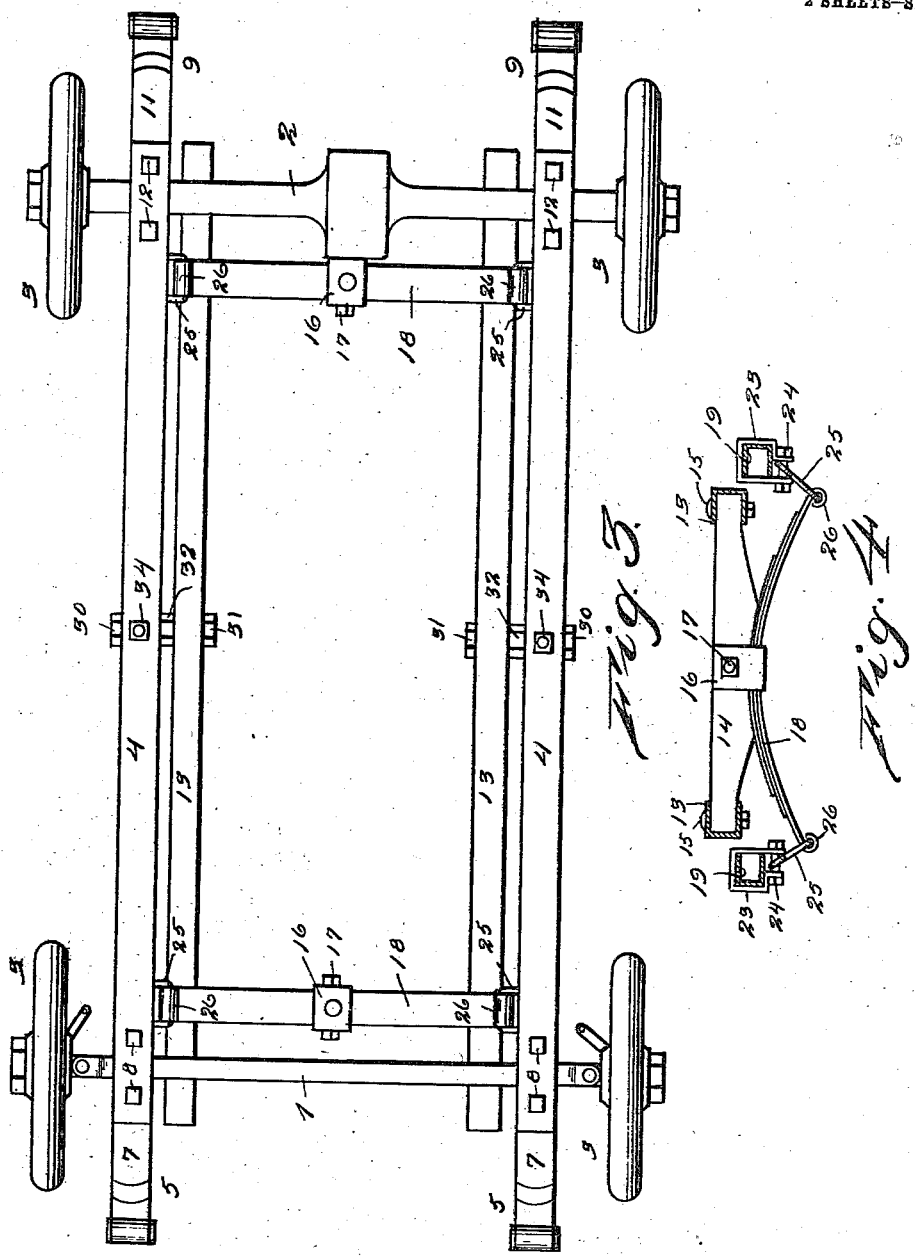

THOMAS W. DUNN, OF OIL CITY, PENNSYLVANIA.

SPRING-MOUNTING.

1,041,255.   Specification of Letters Patent.   Patented Oct. 15, 1912.

Application filed January 31, 1912. Serial No. 674,502.

*To all whom it may concern:*

Be it known that I, THOMAS W. DUNN, a citizen of the United States, residing at Oil City, in the county of Venango and State of Pennsylvania, have invented certain new and useful Improvements in Spring-Mounting, of which the following is a specification.

The present invention relates to a spring mounting particularly adapted for use in connection with automobiles and other vehicles.

An important object of my invention is to provide means of the above mentioned character which will take up all of the primary and secondary shocks in a manner to cause the least inconvenience to the operator of the vehicle.

A further object of the invention is to provide means of the above mentioned character, which are strong, durable, and not liable to derangements.

Other objects and advantages of the invention will be apparent during the course of the following description.

In the accompanying drawings forming a part of this specification and in which like numerals are employed to designate like parts throughout the same, Figure 1 is a plan view of the device, Fig. 2 is a side elevation thereof, Fig. 3 is a bottom plan view, and, Fig. 4 is an end view of the same, parts being omitted.

In the drawings wherein for the sake of illustration, I have shown a preferred embodiment of my invention, the numerals 1 and 2 designate front and rear axles, which carry wheels 3. These axles support the spring mounting. This spring mounting comprises longitudinal beams 4, which are rigidly connected at their opposite ends with the axles 1 and 2, as shown. At the forward ends of the longitudinal beams 4 are disposed leaf-springs 5, comprising upper and lower sets 6 and 7, pivotally connected at their outer ends. The lower sets 7 are rigidly connected with the beams 4 by bolts 8 or the like. At the rear ends of the beams 4 are end leaf-springs 9, comprising upper and lower sets 10 and 11, which are pivotally connected at their outer ends. The lower set 11 is rigidly connected with the beam 4 by means of bolts 12. The beams 4 and axles 1 and 2 form in effect a main rigid frame.

The spring mounting comprises an inner or auxiliary rigid frame formed of longitudinal beams 13, rigidly connected near their ends with transverse pieces or bolsters 14, as shown at 15. Surrounding the transverse pieces or bolsters 14 midway the ends thereof are yokes or clamps 16, held in place by bolts 17. These clamps 16 serve to rigidly connect supporting bow-springs 18 with the transverse pieces 14.

The upper sets 6 of the end springs 5 are rigidly connected with the outer ends of swinging arms or levers 19, by means of bolts 20 or the like. Rigidly connected with the upper sets 10 of the springs 9 are swinging levers or arms 21 by means of bolts 22. Each of the arms or levers 19 and 21 is provided near its forward end with a depending clamp or bracket 23, held in rigid engagement with its beam by a bolt 24. This bolt is engaged by a link 25, which has its lower portion extending through an eye 26 formed at the outer end of the bow-spring 18. The levers 19 and 21 are provided at their inner ends with apertured heads 27 and 28 respectively, rigidly connected therewith by bolts 29 or the like. Bolts 30 pass through these apertured heads and through the beams 13 at points midway the ends of the beams. The bolts 30 are provided on their inner ends with nuts 31 and also with spacing elements 32. The numeral 33 designates coil springs having their lower ends engaging the longitudinal beams 4. At the lower ends of these coil springs the material thereof is passed through openings in the beams 4 and provided with securing means 34. At the upper ends of the springs 33 the turns thereof are in the form of eyes or loops 35, which surround bolts 30 between the heads 27 and 28. It is thus seen that the levers or arms 19 and 21 form an intermediate flexible supporting structure, connected with the springs 5 and 9 at its opposite ends and substantially midway such ends with the inner auxiliary frame comprising beams 13.

The body of the vehicle is disposed upon and suitably connected with the inner auxiliary frame comprising the beams 13.

In the use of the device the end springs 5 and 9 and the bow-springs 18 absorb the primary shocks which would otherwise be transmitted from the main frame including the beams 4 to the auxiliary frame including the beams 13. The coil springs 33 aid in yieldingly supporting the auxiliary frame midway its ends and also absorb the rebound or secondary shocks of this frame.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. In a device of the character described, a main wheeled frame, an intermediate flexible supporting structure, spring connecting means between the end portions of the main wheeled frame and said intermediate flexible supporting structure, an auxiliary frame being between its ends pivotally connected with the intermediate flexible supporting structure to be swung in a vertical plane with relation thereto, and spring connecting means between end portions of the auxiliary frame and intermediate flexible supporting structure.

2. In a device of the character described, a main wheeled frame, springs connected with the ends thereof, levers connected with said springs, an auxiliary frame, means connecting the inner ends of the levers with the sides of the auxiliary frame, supporting springs connected with the end pieces of said auxiliary frame, and connecting means between the supporting springs and said levers.

3. In a device of the character described, a main wheeled frame, springs connected with the ends thereof, levers connected with said springs, an auxiliary frame, means connecting the inner ends of the levers with the sides of the auxiliary frame, supporting springs connected with the end pieces of said auxiliary frame, connecting means between the supporting springs and said levers, and coil springs connected with the inner ends of the levers and the intermediate portion of the main wheeled frame.

4. In a device of the character described, a main wheeled frame, leaf-springs connected with the ends thereof, levers connected with the leaf-springs, an auxiliary frame, means pivotally connecting the inner ends of said levers with the auxiliary frame substantially midway the ends thereof, supporting bow-springs connected with the end pieces of the auxiliary frame, and means pivotally connecting the ends of the supporting bow-springs with said levers.

5. In a device of the character described, a main wheeled frame, an intermediate supporting structure, spring connecting means between end portions of the main wheeled frame and intermediate supporting structure, an auxiliary frame pivotally connected with the intermediate supporting structure to be swung in a vertical plane with relation thereto, and spring connecting means between end portions of said auxiliary frame and said intermediate supporting structure.

6. In a device of the character described, an intermediate flexible supporting structure comprising levers having their adjacent inner ends pivotally connected, suitable supporting means for said levers, an auxiliary frame pivotally connected midway its ends with said levers at their pivot points, and spring connecting means between end portions of the auxiliary frame and intermediate flexible supporting structure.

In testimony whereof I affix my signature in presence of two witnesses.

THOMAS W. DUNN.

Witnesses:
EDWARD J. MEAGHER,
LEE A. McCRACKEN.